Patented July 5, 1938

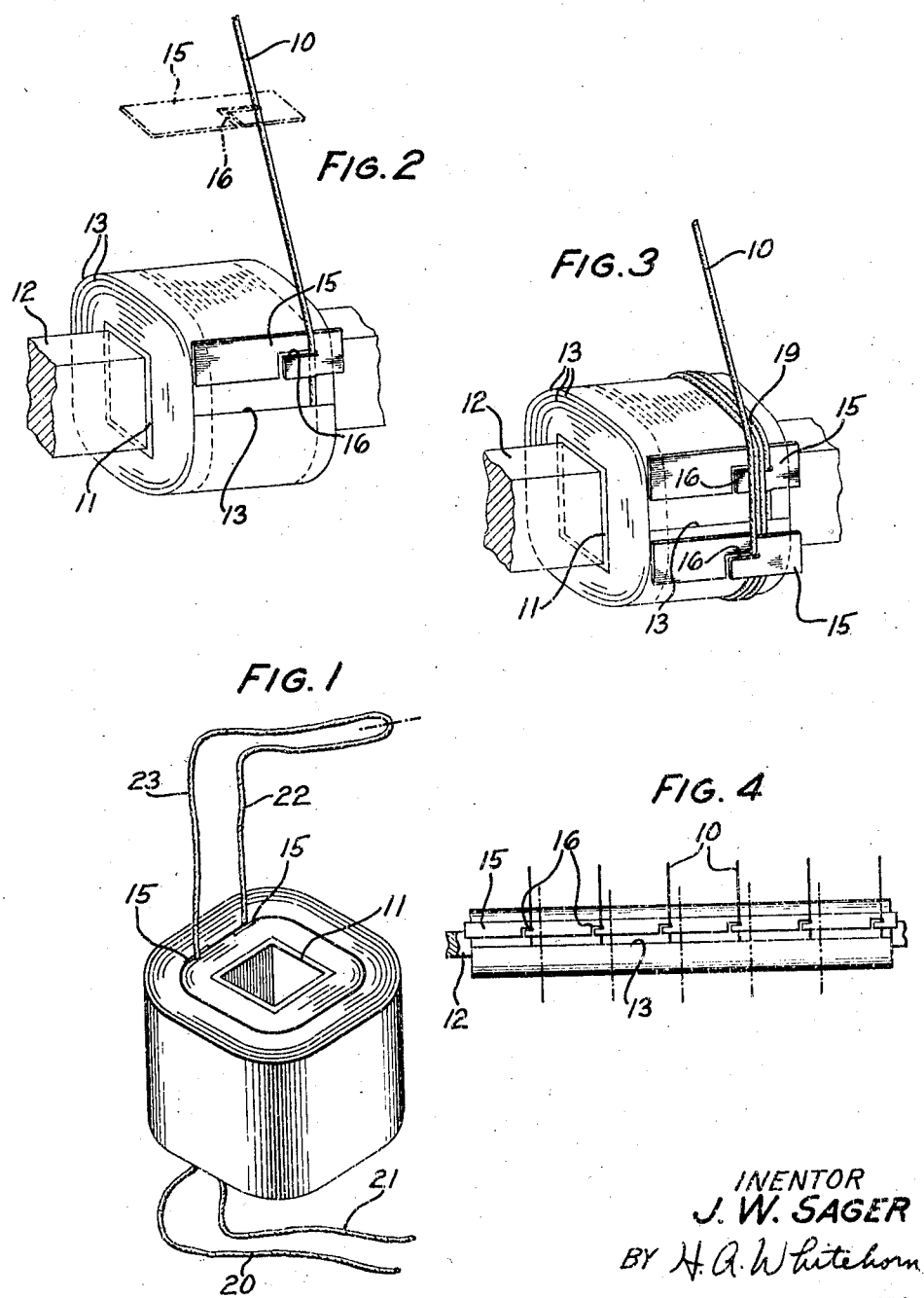

2,122,894

UNITED STATES PATENT OFFICE 2,122,894

ELECTRICAL COIL

John W. Sager, Chicago, Ill., assignor to Western Electric Company, Incorporated, New York, N. Y., a corporation of New York Application October 8, 1935, Serial No. 44,023

1 Claim. (Cl. 175—362)

This invention relates to electrical coils and a method of manufacturing the same, and more particularly to electrical induction coils.

In the manufacture of certain types of electrical induction coils, it is the practice in some instances to wind the primary and secondary windings concentrically from a continuous length of wire and subsequently pull out a portion of the wire intermediate the windings to provide an outer lead for the primary winding and an inner lead for the secondary winding. While this practice has proven advantageous in that it accelerates the winding operation, it has been found that difficulties are sometimes encountered in locating the intermediate portion of the wire and in pulling it out without disturbing the adjacent turns of the primary and/or secondary windings.

An object of the present invention is to improve the construction of electrical coils of the above type and expedite the manufacture thereof by obviating the above mentioned difficulties.

In accordance with one embodiment of the invention, there is provided an electrical induction coil in which a pair of retaining strips are disposed longitudinally of the coil between the primary and secondary windings, the retaining strips being slotted for interlocking engagement with the outer end of the primary winding and the inner end of the secondary winding, respectively, to thereby positively prevent the withdrawal or displacement of more than the several turns of wire between the two anchor strips intended for the leads.

Other features and advantages of the invention will become apparent from the following detailed description thereof when read in conjunction with the accompanying drawing in which Fig. 1 is a perspective view of an electrical induction coil unit embodying the invention;

Figs. 2 and 3 are perspective views illustrating such a coil unit in the process of being wound, and Fig. 4 illustrates the invention as applied to the winding of a plurality of coil units simultaneously.

An induction coil embodying the present invention may be initially formed by winding an insulated wire 10 in successive layers about a tubular core or lining 11 removably placed upon a winding arbor 12 of a suitable winding machine (not shown). Upon the completion of each layer of wire a sheet 13 of insulating material is wrapped therearound to support the next succeeding layer and also to further insulate the adjacent layers of wire from each other.

When the required number of turns of wire have been wound to form a primary circuit of the desired electrical characteristics, the winding operation is temporarily interrupted and a retaining strip 15, preferably composed of insulating material, is introduced into the coil by first inserting the wire in a right angle slot 16 of the retaining strip, as shown in dotted outline in Fig. 2, and then placing the retaining strip longitudinally of the coil in contact with the outer layer of the primary winding and with the slot 16 positioned near one end of the coil. Several turns of wire are then wound about the retaining strip 15 adjacent the slotted end thereof, as indicated at 19, after which a second retaining strip 15 is placed longitudinally of the coil similarly to the first retaining strip and adjacent thereto, as shown in Fig. 3. The winding operation is then resumed and is continued until the required number of turns have been wound to form a secondary circuit of the desired electrical characteristics.

Upon the completion of the winding operation, the coil unit is removed from the winding arbor and, as is customary, the inner end of the primary winding is pulled out to provide an inner lead 20 for the primary winding and the outer end of the secondary winding is pulled out to provide an outer lead 21 for the secondary winding.

The several turns 19 of wire that were wound between the two retaining strips 15 are pulled out and cut medially thereof, as indicated by the dotted line in Fig. 1, to provide an outer lead 22 for the primary winding and an inner lead 23 for the secondary winding. In order that these several turns of wire may be readily located, the retaining strips 15 are preferably constructed and arranged so that the ends thereof extend beyond the adjacent end of the coil unit, and are of a color different from that of the interleaving sheets 13.

An important feature of the invention is the interlocking engagement of the retaining strips with the outer end of the primary winding and the inner end of the secondary winding, respectively, whereby the withdrawal of more than the several intermediate turns 19 of wire intended for the leads is positively prevented.

When winding a series of coil units simultaneously on a single winding arbor, the retaining strips are preferably of sufficient length to extend across the series of coil units, as shown in Fig. 4, and are provided with a series of right angle slots, such as 16, corresponding in number to the number of coil units being wound and spaced apart in accordance with the spacing of the coil units on the arbor. These retaining strips are later severed intermediate adjacent coil units at the time the series or "stick" of coil units is separated into individual coil units by cutting transversely between the coil units, as indicated by the dotted lines in Fig. 4.

It should be understood that the invention is not limited to the particular embodiment thereof herein illustrated and described except insofar as is defined by the following claim.

What is claimed is:

An electrical coil structure comprising concentric inner and outer coils wound from a continuous length of wire, each coil comprising a plurality of layers of windings and retaining means for separating a portion of a layer in one of said coils lying adjacent the other coil from the remaining portion of said layer, whereby said separated portion may be drawn out to form external connections for the respective coils, said retaining means comprising strips of material disposed transversely of said layer of windings, and said strips having angular wire receiving slots for interlocking engagement with the wire at the junctions of said separated portion with the respective coils, whereby the withdrawal of more than said separated portion of said layer is positively prevented.

JOHN W. SAGER.